US008232006B2

(12) United States Patent
Lam et al.

(10) Patent No.: US 8,232,006 B2
(45) Date of Patent: *Jul. 31, 2012

(54) HIGH PERFORMANCE ENERGY STORAGE DEVICES

(75) Inventors: Lan Trieu Lam, Springvale (AU); Nigel Peter Haigh, Wallan (AU); Christopher G Phyland, Ormond (AU); David Anthony James Rand, Beaumaris (AU)

(73) Assignee: Commonwealth Scientific and Industrial Research Organisation, Campbell Act (AU)

( * ) Notice: Subject to any disclaimer, the term of this patent is extended or adjusted under 35 U.S.C. 154(b) by 0 days.

This patent is subject to a terminal disclaimer.

(21) Appl. No.: 12/929,998

(22) Filed: Mar. 1, 2011

(65) Prior Publication Data

US 2011/0151286 A1   Jun. 23, 2011

Related U.S. Application Data

(63) Continuation of application No. 10/571,255, filed as application No. PCT/AU2004/001262 on Sep. 16, 2004, now Pat. No. 7,923,151.

(30) Foreign Application Priority Data

Sep. 18, 2003 (AU) ................................ 2003905086

(51) Int. Cl.
H01M 4/13 (2010.01)
H01M 4/56 (2006.01)
H01M 4/57 (2006.01)
H01M 14/00 (2006.01)
H01M 2/28 (2006.01)
H01M 6/04 (2006.01)
H01G 9/00 (2006.01)

(52) U.S. Cl. ............ 429/228; 429/7; 429/161; 429/204; 361/502

(58) Field of Classification Search .................. 361/502, 361/503; 429/121, 204, 9, 228, 7, 161
See application file for complete search history.

(56) References Cited

U.S. PATENT DOCUMENTS 4,215,190 A   7/1980   Ferrando et al.
(Continued)

FOREIGN PATENT DOCUMENTS

CN   1357899 A   7/2002
(Continued)

OTHER PUBLICATIONS

International Search Report of PCT/AU2004/001262, mailed Nov. 8, 2004.
(Continued)

Primary Examiner — Patrick Ryan
Assistant Examiner — Julian Anthony
(74) Attorney, Agent, or Firm — Nixon & Vanderhye P.C.

(57) ABSTRACT

A lead-acid battery comprising:
at least one lead-based negative electrode;
at least one lead dioxide-based positive electrode;
at least one capacitor electrode; and
electrolyte in contact with the electrodes;
wherein a battery part is formed by the lead based negative electrode and the lead dioxide-based positive electrode; and an asymmetric capacitor part is formed by the capacitor electrode and one electrode selected from the lead based negative electrode and the lead-dioxide based positive electrode; and wherein all negative electrodes are connected to a negative busbar, and all positive electrodes are connected to a positive busbar.

The capacitor electrode may be a capacitor negative electrode comprising carbon and an additive mixture selected from oxides, hydroxides or sulfates of lead, zinc, cadmium, silver and bismuth, or a capacitor negative electrode comprising carbon, red lead, antimony in oxide, hydroxide or sulfate form, and optionally other additives. The capacitor electrode may be used in asymmetric capacitors and batteries of other types.

14 Claims, 7 Drawing Sheets

U.S. PATENT DOCUMENTS

| | | |
|---|---|---|
| 4,567,284 A | 1/1986 | Monzyk et al. |
| 4,576,879 A | 3/1986 | Nakazawa et al. |
| 4,770,954 A | 9/1988 | Noordenbos |
| 4,882,132 A | 11/1989 | Monzyk et al. |
| 4,975,253 A | 12/1990 | Monzyk et al. |
| 5,077,151 A | 12/1991 | Yasuda et al. |
| 5,154,989 A | 10/1992 | Howard et al. |
| 5,260,855 A | 11/1993 | Kaschmitter et al. |
| 5,384,685 A | 1/1995 | Tong et al. |
| 5,419,977 A | 5/1995 | Weiss et al. |
| 5,429,893 A | 7/1995 | Thomas |
| 5,439,756 A | 8/1995 | Anani et al. |
| 5,455,999 A | 10/1995 | Weiss et al. |
| 5,458,043 A | 10/1995 | Jensen et al. |
| 5,464,453 A | 11/1995 | Tong et al. |
| 5,491,399 A | 2/1996 | Gregory et al. |
| 5,518,833 A | 5/1996 | Repplinger et al. |
| 5,526,223 A | 6/1996 | Wu et al. |
| 5,529,971 A | 6/1996 | Kaschmitter et al. |
| 5,534,369 A | 7/1996 | Nagaura |
| 5,547,783 A | 8/1996 | Funato et al. |
| 5,574,353 A | 11/1996 | Bai et al. |
| 5,587,250 A | 12/1996 | Thomas et al. |
| 5,604,426 A | 2/1997 | Okamura et al. |
| 5,626,729 A | 5/1997 | Thompson et al. |
| 5,670,266 A | 9/1997 | Thomas et al. |
| 5,705,259 A | 1/1998 | Mrotek et al. |
| 5,744,258 A | 4/1998 | Bai et al. |
| 5,781,403 A | 7/1998 | Aoki et al. |
| 5,789,338 A | 8/1998 | Kaschmitter et al. |
| 5,821,006 A | 10/1998 | Patel et al. |
| 5,821,007 A | 10/1998 | Harshe et al. |
| 5,849,426 A | 12/1998 | Thomas et al. |
| 5,916,699 A | 6/1999 | Thomas et al. |
| 5,935,724 A | 8/1999 | Spillman et al. |
| 5,935,728 A | 8/1999 | Spillman et al. |
| 5,960,898 A | 10/1999 | Okada et al. |
| 5,993,983 A | 11/1999 | Rozon |
| 6,005,764 A | 12/1999 | Anderson et al. |
| 6,011,379 A | 1/2000 | Singh et al. |
| 6,072,691 A | 6/2000 | Suhara et al. |
| 6,087,812 A | 7/2000 | Thomas et al. |
| 6,088,217 A | 7/2000 | Patel et al. |
| 6,117,585 A | 9/2000 | Anani et al. |
| 6,190,805 B1 | 2/2001 | Takeuchi et al. |
| 6,195,252 B1 | 2/2001 | Belyakov et al. |
| 6,208,502 B1 | 3/2001 | Hudis et al. |
| 6,208,878 B1 | 3/2001 | Hattori et al. |
| 6,222,723 B1 | 4/2001 | Razoumov et al. |
| 6,252,762 B1 | 6/2001 | Amatucci |
| 6,294,893 B1 | 9/2001 | De Abreu |
| 6,304,467 B1 | 10/2001 | Nebrigic |
| 6,310,789 B1 | 10/2001 | Nebrigic et al. |
| 6,316,563 B2 | 11/2001 | Naijo et al. |
| 6,331,365 B1 | 12/2001 | King |
| 6,333,123 B1 | 12/2001 | Davis et al. |
| 6,466,429 B1 | 10/2002 | Volfkovich et al. |
| 6,509,116 B1 | 1/2003 | Kaneko et al. |
| 6,509,713 B2 | 1/2003 | De Abreu |
| 6,517,972 B1 | 2/2003 | Amatucci |
| 6,541,140 B1 | 4/2003 | Spillman et al. |
| 6,576,365 B1 | 6/2003 | Meitav et al. |
| 6,585,915 B2 | 7/2003 | Shinozaki et al. |
| 6,610,440 B1 | 8/2003 | LaFollette et al. |
| 6,623,884 B1 | 9/2003 | Spillman et al. |
| 6,628,504 B2 | 9/2003 | Volfkovich et al. |
| 6,631,073 B1 | 10/2003 | Sakata et al. |
| 6,643,151 B1 | 11/2003 | Nebrigic et al. |
| 6,646,415 B1 | 11/2003 | Nebrigic et al. |
| 6,653,014 B2 | 11/2003 | Anderson et al. |
| 6,680,600 B2 | 1/2004 | Emori et al. |
| 6,687,116 B2 | 2/2004 | Hudis |
| 6,706,079 B1 | 3/2004 | Shmatko et al. |
| 6,737,822 B2 | 5/2004 | King |
| 6,749,963 B2 | 6/2004 | Kurosaki et al. |
| 6,765,363 B2 | 7/2004 | LaFollette et al. |
| 6,869,731 B2 | 3/2005 | Nobuta et al. |
| 6,887,617 B2 | 5/2005 | Sato et al. |
| 6,911,273 B2 | 6/2005 | Faris |
| 7,006,346 B2 | 2/2006 | Volfkovich et al. |
| 7,035,084 B2 | 4/2006 | Kaneko et al. |
| 7,049,792 B2 | 5/2006 | King |
| 7,057,880 B2 | 6/2006 | Kurosaki et al. |
| 7,074,688 B2 | 7/2006 | Kurihara et al. |
| 7,083,876 B2 | 8/2006 | Honbo et al. |
| 7,110,242 B2 | 9/2006 | Adrianov et al. |
| 7,119,047 B1 | 10/2006 | Adrianov et al. |
| 7,144,654 B2 | 12/2006 | LaFollette et al. |
| 7,166,384 B2 | 1/2007 | LaFollette et al. |
| 7,186,473 B2 | 3/2007 | Shiue et al. |
| 7,358,008 B2 | 4/2008 | Nanno et al. |
| 7,397,650 B2 | 7/2008 | Sato et al. |
| 7,420,295 B2 | 9/2008 | Omae et al. |
| 7,462,419 B2 | 12/2008 | LaFollette et al. |
| 7,468,221 B2 | 12/2008 | LaFollette et al. |
| 7,649,335 B2 | 1/2010 | Ishikawa et al. |
| 2001/0011119 A1 | 8/2001 | Naijo et al. |
| 2001/0033501 A1 | 10/2001 | Nebrigic |
| 2001/0044045 A1 | 11/2001 | Sato et al. |
| 2002/0036478 A1 | 3/2002 | De Abreu |
| 2002/0037452 A1 | 3/2002 | Schmidt |
| 2002/0058185 A1 | 5/2002 | Kurosaki et al. |
| 2002/0096661 A1 | 7/2002 | Shinozaki et al. |
| 2002/0132164 A1 | 9/2002 | Kaneko et al. |
| 2002/0155327 A1 | 10/2002 | Faris |
| 2002/0158606 A1 | 10/2002 | King |
| 2002/0161146 A1 | 10/2002 | Naijo et al. |
| 2002/0163771 A1 | 11/2002 | Volfkovich et al. |
| 2002/0176221 A1 | 11/2002 | Hudis |
| 2002/0182485 A1 | 12/2002 | Anderson et al. |
| 2002/0196597 A1 | 12/2002 | Volfkovich et al. |
| 2003/0006737 A1 | 1/2003 | LaFollette et al. |
| 2003/0007317 A1 | 1/2003 | Hudis |
| 2003/0008212 A1 | 1/2003 | Akashi et al. |
| 2003/0011964 A1 | 1/2003 | Hudis |
| 2003/0035982 A1 | 2/2003 | Ryu et al. |
| 2003/0070916 A1 | 4/2003 | Nanno et al. |
| 2003/0091905 A1 | 5/2003 | Nobuta et al. |
| 2003/0094923 A1 | 5/2003 | Emori et al. |
| 2003/0129458 A1 | 7/2003 | Bailey |
| 2003/0152815 A1 | 8/2003 | LaFollette et al. |
| 2004/0009161 A1 | 1/2004 | Escary |
| 2004/0018421 A1 | 1/2004 | LaFollette et al. |
| 2004/0038087 A1 | 2/2004 | Shiue et al. |
| 2004/0053124 A1 | 3/2004 | LaFollette et al. |
| 2004/0057194 A1 | 3/2004 | Hudis |
| 2004/0091777 A1 | 5/2004 | Lam et al. |
| 2004/0121204 A1 | 6/2004 | Adelman et al. |
| 2004/0141282 A1 | 7/2004 | Hudis |
| 2004/0142243 A1 | 7/2004 | Furukawa et al. |
| 2004/0161640 A1 | 8/2004 | Salot |
| 2004/0189226 A1 | 9/2004 | King |
| 2004/0209165 A1 | 10/2004 | Kurosaki et al. |
| 2004/0246658 A1 | 12/2004 | Adrianov et al. |
| 2005/0002150 A1 | 1/2005 | Volfkovich et al. |
| 2005/0081350 A1 | 4/2005 | Kurihara et al. |
| 2005/0089728 A1 | 4/2005 | Arai et al. |
| 2005/0093380 A1 | 5/2005 | LaFollette et al. |
| 2005/0110457 A1 | 5/2005 | LaFollette et al. |
| 2005/0112420 A1 | 5/2005 | Lai et al. |
| 2005/0147885 A1 | 7/2005 | Sato et al. |
| 2005/0170242 A1 | 8/2005 | Sato et al. |
| 2005/0253458 A1 | 11/2005 | Omae et al. |
| 2006/0038536 A1 | 2/2006 | LaFollette et al. |
| 2006/0115732 A1 | 6/2006 | Zaghib et al. |
| 2006/0223701 A1 | 10/2006 | Adrianov et al. |
| 2006/0269801 A1 | 11/2006 | Honbo et al. |
| 2007/0104981 A1 | 5/2007 | Lam et al. |
| 2007/0247787 A1 | 10/2007 | Nakagawa et al. |
| 2008/0197810 A1 | 8/2008 | Ishikawa et al. |
| 2008/0199737 A1 | 8/2008 | Kazaryan et al. |
| 2008/0318135 A1 | 12/2008 | Sung et al. |
| 2009/0291360 A1 | 11/2009 | Kim et al. |

FOREIGN PATENT DOCUMENTS

| | | |
|---|---|---|
| CN | 101414691 A | 4/2009 |
| EP | 0 354 966 B1 | 1/1989 |

| | | |
|---|---|---|
| EP | 0 354 966 A1 | 7/1989 |
| EP | 0 555 422 B1 | 2/1992 |
| EP | 0 662 726 A2 | 12/1994 |
| EP | 0 662 726 A3 | 12/1994 |
| EP | 0 801 834 B1 | 4/1996 |
| EP | 0 934 607 B1 | 9/1997 |
| EP | 0 964 416 A1 | 11/1997 |
| EP | 0 851 445 A2 | 12/1997 |
| EP | 0 851 445 B1 | 12/1997 |
| EP | 0 872 908 A1 | 4/1998 |
| EP | 0 872 908 B1 | 4/1998 |
| EP | 0 893 790 A2 | 7/1998 |
| EP | 0 893 790 B1 | 7/1998 |
| EP | 1 115 130 A1 | 8/1999 |
| EP | 1 000 796 A2 | 11/1999 |
| EP | 1 190 480 B1 | 6/2000 |
| EP | 1 071 148 A2 | 7/2000 |
| EP | 1 071 148 B1 | 7/2000 |
| EP | 1 126 536 A2 | 2/2001 |
| EP | 1 126 536 B1 | 2/2001 |
| EP | 1 179 871 A2 | 8/2001 |
| EP | 1 189 295 A2 | 9/2001 |
| EP | 1 251 576 A2 | 4/2002 |
| EP | 1 315 227 A2 | 4/2002 |
| EP | 1 391 961 A1 | 8/2002 |
| EP | 1 391 961 B1 | 8/2002 |
| EP | 1 309 028 A2 | 10/2002 |
| EP | 1 309 028 B1 | 10/2002 |
| EP | 1 418 428 A1 | 11/2002 |
| EP | 1 496 556 A1 | 4/2003 |
| EP | 1 496 556 B1 | 4/2003 |
| EP | 1 541 422 A1 | 7/2003 |
| EP | 1 775 786 A1 | 7/2003 |
| EP | 1 561 105 B1 | 11/2003 |
| EP | 1 783 792 A1 | 7/2004 |
| EP | 1 189 295 B1 | 12/2005 |
| EP | 1 386 336 B1 | 1/2006 |
| EP | 2 184 796 A1 | 7/2007 |
| FR | 2692077 | 12/1993 |
| JP | 61-283173 | 12/1986 |
| JP | 04 043557 A | 2/1992 |
| JP | 4061214 | 2/1992 |
| JP | 4-233170 | 8/1992 |
| JP | 4-294515 | 10/1992 |
| JP | 10 021900 A | 1/1998 |
| JP | 10-294135 | 11/1998 |
| JP | 11-97319 | 4/1999 |
| JP | 11-224699 | 8/1999 |
| JP | 2000-13915 | 1/2000 |
| JP | 2000-21408 | 1/2000 |
| JP | 2001-110418 | 4/2001 |
| JP | 2001-313237 | 11/2001 |
| JP | 2001-319655 | 11/2001 |
| JP | 2001-332264 | 11/2001 |
| JP | 2001-351688 | 12/2001 |
| JP | 2002-47372 | 2/2002 |
| JP | 2002-50543 | 2/2002 |
| JP | 2002-50544 | 2/2002 |
| JP | 2002-75788 | 3/2002 |
| JP | 2002-118036 | 4/2002 |
| JP | 2002-298853 | 10/2002 |
| JP | 2003-051306 | 2/2003 |
| JP | 2003-51306 | 2/2003 |
| JP | 2003-51306 A | 2/2003 |
| JP | 2003-077458 | 3/2003 |
| JP | 2003-87988 | 3/2003 |
| JP | 2003-132941 | 5/2003 |
| JP | 2003-200739 | 7/2003 |
| JP | 2004-047613 A2 | 2/2004 |
| JP | 2004-55240 | 2/2004 |
| JP | 2004-55541 | 2/2004 |
| JP | 2004-134369 | 4/2004 |
| JP | 2004-221523 | 8/2004 |
| JP | 2004-273443 | 9/2004 |
| JP | 2004-355823 | 12/2004 |
| JP | 2005-32938 | 2/2005 |
| JP | 2005-80470 | 3/2005 |
| JP | 2005-160271 | 6/2005 |
| JP | 2005-294497 | 10/2005 |
| JP | 2005-327489 | 11/2005 |
| JP | 2005-353652 | 12/2005 |
| JP | 2006-252902 | 9/2006 |
| JP | 2006-310628 | 11/2006 |
| JP | 2006-325331 | 11/2006 |
| JP | 2007-226996 | 9/2007 |
| JP | 2007-280803 | 10/2007 |
| JP | 2008-22605 | 1/2008 |
| JP | 2008-047452 A2 | 2/2008 |
| JP | 2008-146898 A2 | 6/2008 |
| JP | 2008-150270 | 7/2008 |
| JP | 2008-171766 | 7/2008 |
| JP | 2009-135056 | 6/2009 |
| WO | WO 89/06865 | 7/1989 |
| WO | WO92/11174 A1 | 7/1992 |
| WO | WO93/05541 A1 | 3/1993 |
| WO | WO93/14511 A1 | 7/1993 |
| WO | WO94/07272 A1 | 3/1994 |
| WO | WO95/21466 | 8/1995 |
| WO | WO95/23437 A1 | 8/1995 |
| WO | WO96/11522 | 4/1996 |
| WO | WO96/17361 | 6/1996 |
| WO | WO96/30959 | 10/1996 |
| WO | WO97/12415 | 4/1997 |
| WO | WO98/08266 | 2/1998 |
| WO | WO98/19357 | 5/1998 |
| WO | WO98/24100 | 6/1998 |
| WO | WO98/40925 | 9/1998 |
| WO | WO98/40926 A1 | 9/1998 |
| WO | WO98/54816 | 12/1998 |
| WO | WO99/24996 | 5/1999 |
| WO | WO00/02213 | 1/2000 |
| WO | WO00/11688 | 3/2000 |
| WO | WO00/63929 | 10/2000 |
| WO | WO01/01553 A1 | 1/2001 |
| WO | WO01/17054 A1 | 3/2001 |
| WO | WO 01/41232 A2 | 6/2001 |
| WO | WO 01/95410 A1 | 12/2001 |
| WO | WO02/01655 A1 | 1/2002 |
| WO | WO02/052664 A2 | 7/2002 |
| WO | WO02/087006 | 10/2002 |
| WO | WO02/091412 A1 | 11/2002 |
| WO | WO02/099956 A2 | 12/2002 |
| WO | WO03/036670 A2 | 5/2003 |
| WO | WO03/055791 A2 | 7/2003 |
| WO | WO03/077333 A1 | 9/2003 |
| WO | WO03/088385 A1 | 10/2003 |
| WO | WO03/094184 A1 | 11/2003 |
| WO | WO03/098648 A1 | 11/2003 |
| WO | WO2004/008560 A2 | 1/2004 |
| WO | WO2004/012964 A1 | 2/2004 |
| WO | WO2004/038051 A1 | 5/2004 |
| WO | WO 2004/042394 A2 | 5/2004 |
| WO | WO2005/027255 A1 | 3/2005 |
| WO | WO2005/041343 A1 | 5/2005 |
| WO | WO2006/006218 A1 | 1/2006 |
| WO | WO2006/062349 A1 | 6/2006 |
| WO | WO2006/109909 A1 | 10/2006 |
| WO | WO2006/132052 A2 | 12/2006 |
| WO | WO2007/017506 A1 | 2/2007 |
| WO | WO2007/058421 A1 | 5/2007 |
| WO | WO2007/097534 A1 | 8/2007 |
| WO | WO2008/016236 A1 | 2/2008 |
| WO | WO2008/070914 A1 | 6/2008 |
| WO | WO2008/101190 A1 | 8/2008 |
| WO | WO2008/113133 A1 | 9/2008 |
| WO | WO2009/013796 A1 | 1/2009 |
| WO | WO2009/041180 A1 | 4/2009 |
| WO | WO2009/071292 A1 | 6/2009 |
| WO | WO2009/094931 A1 | 8/2009 |
| WO | WO2009/101047 A1 | 8/2009 |
| WO | WO2009/128482 A1 | 10/2009 |

OTHER PUBLICATIONS

Examiner's Report No. 2 on Australian Patent Appln. No. 2004273104 dated Sep. 21, 2009.

Lam et al, "Development of ultra-battery for hybrid-electric vehicle applications", Journal of Power Sources 158 (2006) 1140-1140.

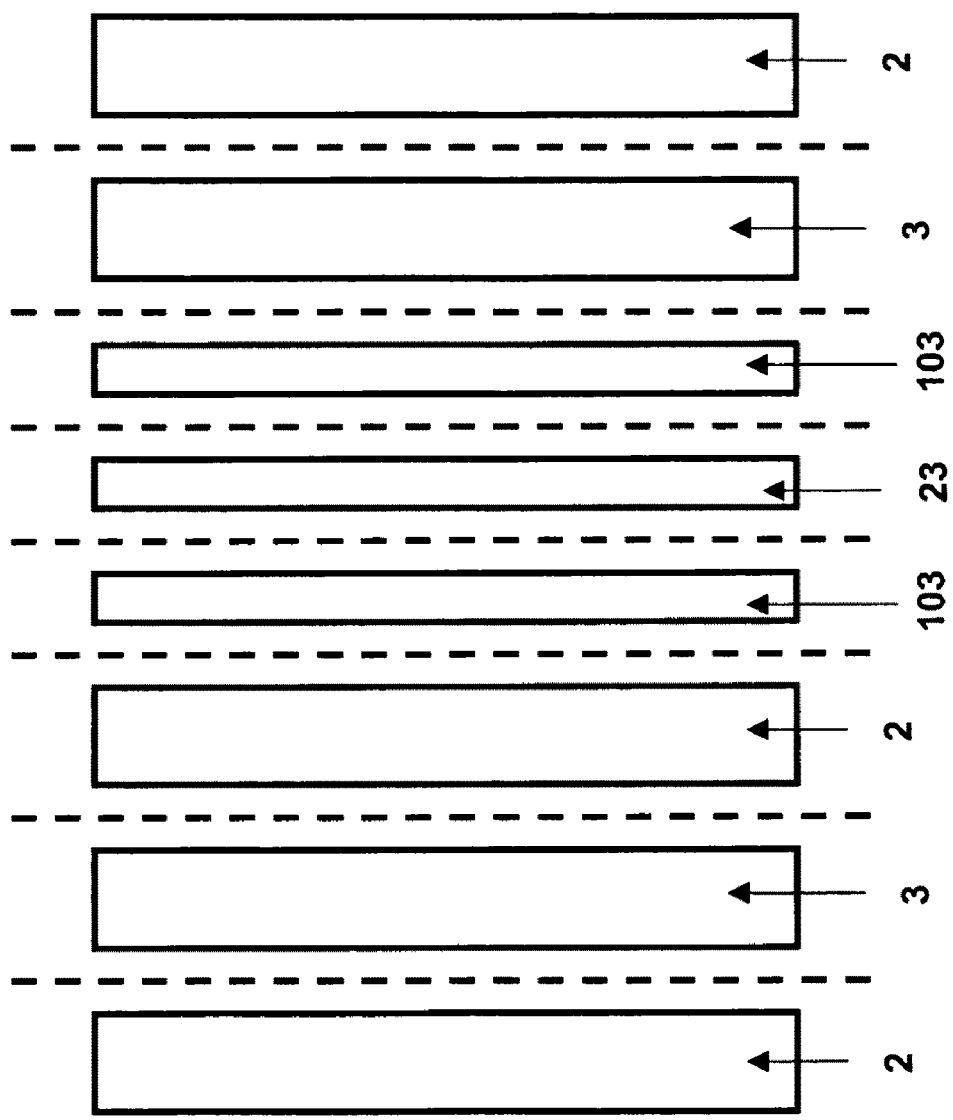

HIGH PERFORMANCE ENERGY STORAGE DEVICES

This application is a continuation of application Ser. No. 10/571,255 filed Jan. 10, 2007, now U.S. Pat. No. 7,923,151 now allowed, which in turn is the US national phase of international application PCT/AU2004/001262, filed 16 Sep. 2004, which designated the U.S. and claims priority of AU 2003905086, filed 18 Sep. 2003, the entire contents of each of which are hereby incorporated by reference.

BACKGROUND OF THE INVENTION

The present invention relates to high performance energy storage devices, including batteries such as lead-acid batteries and other battery types, as well as capacitor electrodes and asymmetric capacitors.

There is growing demand for the development and introduction of vehicles that do not rely almost entirely on fossil fuels, to combat air pollution in urban environments and to reduce the global consumption of limited supplies of the fossil fuels. Such vehicles fall into three main classes: electric vehicles (EVs), hybrid electric vehicles (HEVs) and mild hybrid electric vehicles (also known as 42-volt powernet vehicles).

Electric vehicles and hybrid electric vehicles may use a variety of different battery types, including lead-acid batteries. Mild hybrid electric vehicles may use mainly lead-acid batteries because of reduced cost. Hybrid and mild hybrid electric vehicles rely on a combination of an internal combustion engine and a battery for power supply. Due to the increasing on-board power requirements in the present luxury cars (internal combustion engine cars), the capability of present 14-volt alternators is close to or beyond its limitation. Thus, mild hybrid electric vehicles have been developed. Such mild hybrid electric vehicles employ a 36-volt battery and a 42-volt alternator. The mild hybrid electric vehicles provide some advantages over the existing internal combustion engine cars, including higher use of the electrically generated power, resulting in lower emissions.

Whilst there have been many significant advances in the development of new batteries and power networks for vehicles relying at least partly on electric power, the batteries used in these vehicles still suffer from a number of problems.

In all of these batteries, different demands are placed on the battery in terms of the current drawn from and recharged to the battery at various stages during vehicle operation. For example, a high rate of discharge is needed from the battery to enable acceleration or engine cranking in electric and hybrid electric vehicles, respectively. A high rate of recharging of the battery is associated with regenerative braking.

In the situation where lead-acid batteries are utilised, particularly in hybrid and mild hybrid electric vehicles, the high rate of battery discharging and recharging results in the formation of a layer of lead sulphate on the surface of the negative plate, and the generation of hydrogen/oxygen at the negative and positive plates. This largely arises as a result of high current demands on the battery. The partial state-of-charge conditions (PSoC) under which these batteries generally operate is 20-100% for electric vehicles, 40-60% for hybrid electric vehicles, and 70-90% for mild hybrid electric vehicles. This is a high rate partial state-of-charge (HRPSoC). Under simulated HRPSoC duty, such as hybrid and mild hybrid electric vehicle operations, the lead-acid batteries fail prematurely mainly due to the progressive accumulation of lead sulphate on the surfaces of the negative plates. This occurs because the lead sulphate cannot be converted efficiently back to sponge lead during charging either from the regenerative braking or from the engine. Eventually, this layer of lead sulphate develops to such an extent that the effective surface area of the plate is reduced markedly, and the plate can no longer deliver the higher current demanded from the automobile. This significantly reduces the potential life span of the battery.

In other technology fields, including mobile or cell phone technology, it would be advantageous to provide alternative battery types that offer improved overall lifespan and performance whilst catering for the different power demands on the device.

Accordingly, there exists a need for modified batteries, including lead-acid batteries, that have an improved life span and/or improved overall performance compared to current batteries.

SUMMARY OF THE INVENTION

According to one aspect, there is provided a lead-acid battery comprising:
  at least one lead-based negative electrode,
  at least one lead dioxide-based positive electrode,
  at least one capacitor negative electrode, and
  electrolyte in contact with the electrodes,
wherein the positive electrode and the lead-based negative electrode define a battery part, and the positive electrode and the capacitor negative electrode define an asymmetric capacitor part, with the positive electrode shared by the battery part and the asymmetric capacitor part, and wherein the lead-based negative and capacitor negative electrodes are connected to a negative busbar, and the positive electrode or electrodes are connected to a positive busbar.

Thus, the lead dioxide battery part and the asymmetric capacitor part of the lead-acid battery are connected in parallel in the one common unit. Hence, the asymmetric capacitor part preferentially takes or releases charge during high current charging or discharging. This occurs since the asymmetric capacitor part has a lower internal resistance than the battery-part, and will first absorb and release charge during high-rate charging (for instance during regenerative braking) or during high-rate discharging (for instance during vehicle acceleration and engine cranking). Consequently, the asymmetric capacitor part will share the high-rate operation of the lead-acid battery part, and will provide the lead-acid battery with significantly longer life. All of this is achieved without any electronic control or switching between the battery and capacitor parts.

According to one embodiment, the positive electrode shared by the two parts is disposed between the lead-based negative electrode and the capacitor negative electrode.

It will be appreciated that the reverse arrangement may be utilised, in which the shared electrode is the lead-based negative electrode. The lead-based negative electrode will define an asymmetric capacitor part with a capacitor positive electrode.

Thus, allowing for the two alternative arrangements, a second aspect provides a lead-acid battery comprising:
  at least one lead-based negative electrode;
  at least one lead dioxide-based positive electrode;
  at least one capacitor electrode; and
  electrolyte in contact with the electrodes;
wherein a battery part is formed by the lead based negative electrode and the lead dioxide-based positive electrode; and an asymmetric capacitor part is formed by the capacitor electrode and one electrode selected from the lead based negative electrode and the lead dioxide based positive electrode; and wherein all negative electrodes are connected to a negative busbar, and all positive electrodes are connected to a positive busbar.

According to this aspect, each of the capacitor electrodes may individually be positive or negative electrodes.

Preferably, the lead-acid battery comprises an alternating series of positive and negative electrodes. Of the alternating electrodes, each of these may be a battery electrode, a capacitor electrode, or a combined battery/capacitor electrode. These electrode types will be described in further detail below.

According to a third aspect of the present invention, there is provided a lead-acid battery comprising an alternating series of positive and negative electrodes and an electrolyte in contact with the electrodes, wherein:
- at least one pair of adjacent positive and negative electrode regions store energy capacitively, and
- at least one pair of adjacent lead dioxide positive and lead negative battery electrode regions store energy electrochemically, and wherein the positive electrodes are directly connected by a first conductor and the negative electrodes are directly connected by a second conductor.

In a further aspect of the invention, it has been found that if there is a mismatch in the potential window or potential operational range of one of the electrodes, hydrogen gassing may occur. This particularly applies when the cell voltage is greater than the potential range of an electrode. Hydrogen gassing is undesirable as it leads to premature failure of the battery at the electrode where gassing occurs.

To avoid a mismatch, according to a further embodiment, at least one of the capacitor negative electrodes comprises a high surface area capacitor material and one or more additives selected from oxides, hydroxides or sulfates of lead, zinc, cadmium, silver and bismuth. The additives are preferably added in oxide form. The additives are preferably lead and/or zinc additives, most preferably lead and/or zinc oxide.

Mismatching can also occur at the capacitor positive electrode. Thus, according to one embodiment in which the battery comprises a capacitor positive electrode, the capacitor positive electrode comprises:
- a high surface area capacitor material,
- $Pb_2O_3$,
- an oxide, hydroxide or sulfate of antimony, and
- optionally one or more additives selected from oxides, hydroxides and sulfates of iron and lead.

This aspect of the invention can be applied equally to other hybrid battery types to avoid gasing.

Thus, according to a fourth aspect of the invention, there is provided a hybrid battery-capacitor comprising:
- at least one battery-type positive electrode,
- at least one battery-type negative electrode,
- at least one capacitor-type electrode selected from a capacitor negative electrode and a capacitor positive electrode, wherein the capacitor negative electrode comprises a high surface area capacitor material and one or more additives selected from oxides, hydroxides or sulfates of lead, zinc, cadmium, silver and bismuth, and wherein the capacitor positive electrode comprises:
- a high surface area capacitor material,
- $Pb_2O_3$,
- an oxide, hydroxide or sulfate of antimony, and
- optionally one or more additives selected from oxides, hydroxides and sulfates of iron and lead, and
- an electrolyte in contact with the electrodes, wherein a battery part is formed between (i.e. defined by) the battery-type positive electrode and the battery-type negative electrode, and an asymmetric capacitor part is formed between the capacitor electrode and one of the battery-type electrodes, wherein one of the battery-type electrodes shared by the battery part and the asymmetric capacitor part, and wherein the negative electrodes are in direct electrical connection to a first conductor, and the positive electrodes are in direct electrical connection to a second conductor.

According to a further aspect of the invention, there is also provided novel capacitor electrodes based on the above concept. The novel capacitor negative electrode comprises a current collector and a paste coating, the paste coating comprising a high surface area capacitor material, a binder and between 5-40 wt %, based on the weight the paste coating, of an additive or additive mixture selected from oxides, hydroxides or sulfates of lead, zinc, cadmium, silver and bismuth, with the proviso that the additive includes at least one oxide, hydroxide or sulfate of lead or zinc.

The novel capacitor positive electrode comprises a current collector and a paste coating, the paste coating comprising a high surface area capacitor material, a binder and between 10-40 wt %, based on the weight the paste coating, of an additive mixture comprising:
- $Pb_2O_3$,
- an oxide, hydroxide or sulfate of antimony, and
- optionally one or more oxides, hydroxides or sulfates of iron and lead.

Finally, there is also provided an asymmetric capacitor comprising the capacitor electrodes described above.

BRIEF DESCRIPTION OF THE DRAWINGS

FIG. 8 is a schematic side view representing the electrode arrangement of a battery of a third embodiment of the invention.

DETAILED DESCRIPTION OF THE INVENTION

Figure 1:
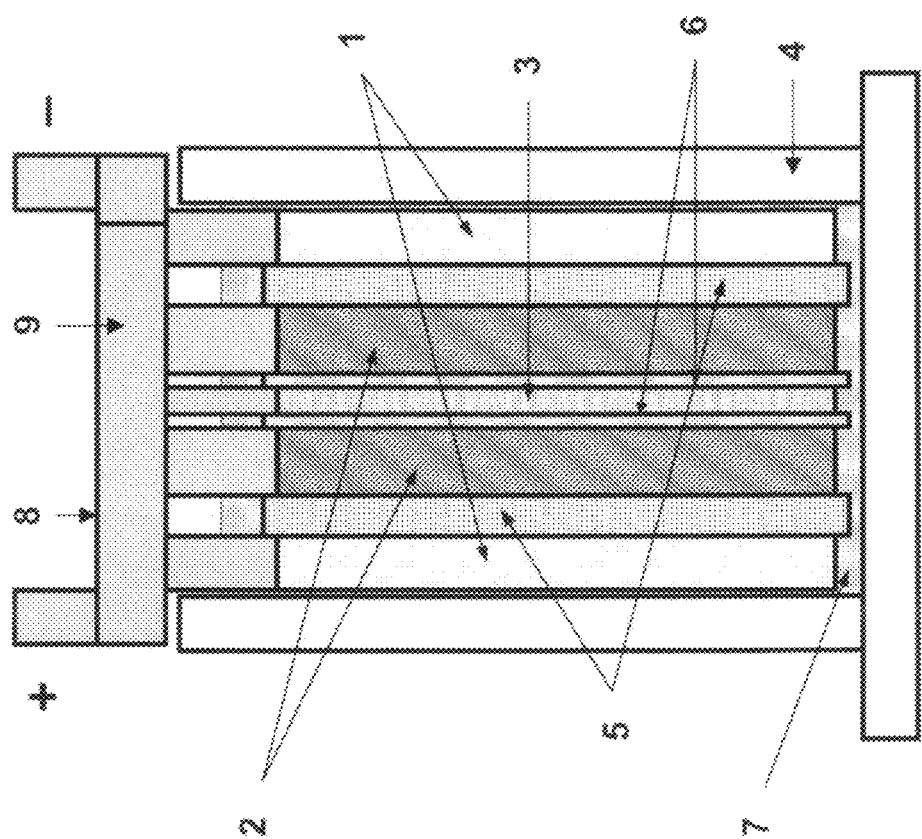
FIG. 1 is a schematic side view of a lead-acid battery in accordance with one embodiment of the invention.

The present invention will now be described in further detail with reference to preferred embodiments of the invention.

To avoid any doubt, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

General Features

The term "lead-acid battery" is used in its broadest sense to encompass any unit containing one or more lead-acid battery cells.

The lead-acid batteries described contain at least one lead-based negative electrode or region, at least one lead dioxide-based positive electrode or region and at least one capacitor negative electrode or region.

In the following each of these electrode types are described, followed by the electrode region concept.

Electrode Structure

Electrodes generally comprise a current collector (otherwise known as a grid or plate), with the active electrode material applied thereto. The active electrode material is most commonly applied in a paste form to the current collector, and in the present specification the term paste applies to all such active-material containing compositions applied in any way to the current collector. The term "based" used in the context of electrodes is intended to refer to the active electrode material. This term is used to avoid suggesting that the electrode is formed entirely from the active material, as this is not the case. The term also is intended to indicate that the active material of the given electrode may contain additives or materials other than the active material specifically mentioned.

Lead and Lead Dioxide Based Electrodes.

The lead and lead dioxide electrodes may be of any arrangement or type suitable for use in a lead-acid battery. Generally, such electrodes are in the form of a metal grid (usually made from lead or lead alloy) that supports the electrochemically active material (lead or lead dioxide) which is pasted onto the grid. The operation of pasting is well known in the field. Although any suitable lead or lead dioxide known in the art may be used, it would be advantageous to use the lead compositions disclosed in co-pending application PCT/AU2003/001404 (claiming priority from Australian Patent Application AU 2002952234). It is to be noted that, prior to formation of the battery, the active material may not be in the active form (i.e. it may not be in the form of the metal, or in the dioxide form). Thus, the terms encompass those other forms which are converted to lead metal or lead dioxide when the battery is formed.

Capacitor Electrodes

Capacitor electrodes similarly comprise a current collector and a coating of an active material. This is commonly applied as a paste.

The term "capacitor" is used in the context of electrodes to refer to electrodes that store energy through the double layer capacitance of a particle/solution interface between high surface area materials and an electrolyte solution.

There are two main classes of capacitors. One class is the "double-layer capacitors" (otherwise known as "symmetric capacitors") containing two such electrodes, one as the positive and the other as the negative. The second class is the asymmetric capacitors, which are also referred to as hybrid capacitors, "ultracapacitors" and "supercapacitors".

Asymmetric capacitors comprise one electrode that stores energy through double layer capacitance across a particle/solution interface, and a second electrode that is a faradaic or battery-type electrode which stores energy pseudocapacitively. The prefixes "ultra" and "super" are sometimes used to refer generically to asymmetric capacitors, and sometimes to refer to such capacitors having large storage capability. In the present application the prefix "ultra" is most usually used in this first sense, but on occasion it is used in the second sense, as the capacitance of the capacitor parts of the batteries of the present invention preferably have high capacitance.

The asymmetric capacitor parts preferably have ultracapacitor capacitance, more preferably of supercapacitor capacitance.

Generally, as with the lead and lead oxide electrodes, the capacitor electrode comprises a metal grid (usually made from a lead alloy) and a pasted coating containing the capacitor material, usually with a binder. Examples of a suitable binders for the paste compositions are carboxymethyl cellulose and neoprene.

The capacitor electrode suitably comprises a high surface area (or high-rate) materials suitable for use in capacitors. Such materials are well known in the art. These high-rate capacitor materials include high surface area carbon, ruthenium oxide, silver oxide, cobalt oxide and conducting polymers. Preferably, the capacitor negative electrode comprises a high surface area carbon material. Examples of high surface area carbon materials are activated carbon, carbon black, amorphous carbon, carbon nanoparticles, carbon nanotubes, carbon fibres and mixtures thereof.

Often mixtures of materials are used to obtain an appropriate balance between surface area (and thus capacitance) and conductivity. Currently, for cost reasons, activated carbon is the most appropriate source. One suitable activated carbon material is one with a surface area of between 1000 and 2500 $m^2/g$, preferably 1000-2000 $m^2/g$. This material is suitably used in combination with a more conductive material, such as carbon black. One suitable carbon black material has a surface area of between 60-1000 $m^2/g$. One suitable mixture of these materials comprises between 5-20% carbon black, 40-80% activated carbon, 0-10% carbon fibres, and the balance binder at a level of between 5-25%. All measurements are by weight unless specified otherwise.

Additive Content of Capacitor Electrodes

As described above, it has been found that if there is a mismatch in the potential window or potential operational range of one of the electrodes, hydrogen and/or oxygen gassing may occur. According to one embodiment, to suppressing hydrogen gassing, the capacitor negative electrodes comprise an additive or additive mixture comprising an oxide, hydroxide or sulfate of lead, zinc, cadmium, silver and bismuth, or a mixture thereof. Generally, it is preferred that the additive includes at least one oxide, hydroxide or sulfate of lead or zinc. For convenience, the additive is suitably one or more oxides selected from lead oxide, zinc oxide, cadmium oxide, silver oxide and bismuth oxide. Preferably each of the capacitor negative electrodes comprise the additive in addition to the high surface area capacitor material. Due to toxicity reasons, cadmium compounds are not preferred, and therefore the composition preferably comprises a lead compound and/or zinc compound, and optionally a silver compound. For cost reasons, silver oxide and bismuth oxide would usually be avoided.

Irrespective of the form in which the additive is added, when conductor comes into contact with the electrolyte (for example, sulfuric acid), the additive may react with the electrolyte and thus be converted into another metal compound derived from the original metal oxide, sulfate or hydroxide. References to the oxides, sulfates and hydroxides of the subject additives are to be read as encompassing the products of the reactions between the additives and the electrolyte. Similarly, if during the charged or discharged state of the battery the additive is converted into another form through redox reactions, the references to the oxides, sulfates and hydroxides are to be read as encompassing the products of the redox reactions on these additives.

To suppressing oxygen gassing, the capacitor positive electrodes preferably comprises:

a high surface area capacitor material (as described above),
$Pb_2O_3$ ("red lead"),
an oxide, hydroxide or sulfate of antimony, and
optionally one or more additives selected from oxides, hydroxides and sulfates of iron and lead.

The compound of antimony is beneficial in suppressing (oxygen) gassing at the positive capacitor electrode. However, if it migrates to the negative capacitor electrode, it produces an adverse effect on hydrogen gassing at that electrode. In the absence of an agent to fix the antimony compound to the positive capacitor electrode, when the antimony compound comes into contact with the electrolyte, it may dissolve in the electrolyte, and be deposited on the negative electrode when a current is applied. The red lead is used to fix or prevent transfer of the antimony to the negative electrode. Compounds (i.e. oxides, sulfates or hydroxides) of lead and iron are also advantageous in this electrode, and may also be used in the additive mixture.

In each case, the additive is used in amount to avoid hydrogen and oxygen gassing. This is generally an amount that increases the potential window of the capacitor negative and positive electrode from the typical ±0.9V or ±1.0V to at least ±1.2V, and preferably at least ±1.3V. In general terms, the total oxide content may be between 5-40 wt %, based on the total active material composition (including high surface active material, binder, and any other component in the dried paste composition).

Preferably, the negative capacitor electrode additive comprises between 1-40 wt % Pb compound (more preferably 1-20%), 1-20 wt % Zn compound (more preferably 1-10%), 0-5 wt % Cd compound and 0-5 wt % Ag compound. Preferably the total is within the 5-40 wt % range mentioned above. The use of ZnO additive alone provides good results, as does PbO alone, or a mixture of PbO and ZnO.

Preferably, the positive capacitor electrode additive comprises between 0-30 wt % Pb (preferably 1-30 wt %) in oxide (any oxide), sulfate or hydroxide form, 1-10 wt % $Pb_2O_3$, 0-2 wt % Fe (preferably 1-2 wt %) in oxide, sulfate or hydroxide form and 0.05 to 1 wt % Sb in oxide, sulfate or hydroxide form. Preferably Sb is added as an oxide. Preferably the total is within 5-40 wt % range mentioned above.

Other Applications for Capacitor Electrodes

The additive-containing capacitor electrodes may be used with a battery type electrode (lead or lead dioxide) and an electrolyte to form an asymmetric capacitor, without any battery positive and battery negative electrode pair defining a battery part. This asymmetric capacitor containing novel components can be externally connected to a battery in the conventional manner, but without any extra electronic device.

Other Electrodes

As described in further detail below, the battery may include electrodes of other types in addition to or as a replacement of the electrodes described above. In particular, the battery may comprise one or more mixed capacitor-battery electrodes, such as a capacitor-battery positive electrode.

In the situation where the capacitor positive electrode (as described above) comprises lead oxide, this is converted into lead dioxide during charging of the battery. Thus, the capacitor electrode comprising a lead source which is converted into lead dioxide in operation of the battery may be considered to be a capacitor-battery electrode having some qualities of both a capacitor electrode and a battery electrode.

The incorporation of high surface area material such as carbon into some positive electrodes may be undertaken to address the need to balance the surface area ratio of the positive to negative electrodes. In the absence of any capacitor positive electrodes, the high surface area capacitor negative electrodes will add to a greater overall surface area for negative electrodes compared to positive electrodes. When there is a surface area imbalance, failure of the lower surface area electrodes. By making the surface area of the positive electrode greater, by incorporating high surface area carbon into some positive electrodes, the balance is addressed.

As a consequence of the above, it will be appreciated to persons in the art that the battery may comprise an alternating series of positive and negative electrodes, with an electrolyte in contact with the electrodes, and a first conductor for directly connecting the positive electrodes and a second conductor for directly connecting the negative electrodes, wherein at least one pair of the adjacent positive and negative electrode regions form a capacitor (by storing capacitive energy), and at least one pair of adjacent positive and negative electrode regions form a battery (by storing energy as electrochemical potential between the two electrode pairs).

Regions

The electrodes of the present invention may be composite electrodes (i.e. they may be composites of battery electrode materials and capacitor electrode materials). The references to "lead-based", "lead dioxide-based" and "capacitor" electrodes encompass the regions of an electrode that have the specified function, irrespective of whether or not the single electrode has other regions of a different type.

According to one embodiment of the invention, electrodes having regions of different types are deliberately used. According to this embodiment, one or more of the negative electrodes has at least two regions, including a battery-electrode material region and a capacitor-electrode material region. As one example, the electrode having two regions comprises an electrode current collector, which may be of the type described above, having one face pasted with battery electrode material (such as lead) and the opposite face pasted with capacitor negative electrode material. Alternatively, a battery-type electrode containing battery electrode material on both sides may be coated on one face or any other region thereof by a capacitor electrode material.

Other Battery Electrode Types

According to the aspect of the invention in which the capacitor electrode comprises carbon with an additive to avoid hydrogen gassing, the battery electrodes may be of types other than lead lead-acid battery electrodes. The battery types of this embodiment are nickel rechargeable batteries, lithium metal or lithium ion rechargeable batteries, and so forth. Suitable battery-type positive electrode materials in this case include nickel oxide, silver oxide, manganese oxide, lithium polymer materials, mixed lithium oxides including lithium nickel oxides, lithium cobalt oxides, lithium manganese oxides and lithium vanadium oxides, and lithium conductive polymer cathode materials. Suitable battery-type negative electrode materials in this class include zinc, cadium, metal hydrides, lithium in metal or alloy form with other metals such as aluminium, and lithium ion intercalation materials. The details of, and alternatives for, these electrode materials used in various battery types can be gathered from various publications in the art of the invention.

Physical Configuration

The electrodes may be of any suitable shape, and therefore may be in flat-plate form or in the form of a spirally-wound plate for the formation of either prismatic or spirally-wound cells. For simplicity of design, flat plates are preferred.

Electrolyte

In the case of lead-acid batteries, any suitable acid electrolyte may be used. The electrolyte may, for instance, be in the form of a liquid or a gel. Sulphuric acid electrolyte is preferred.

In the case of other battery types, the electrolyte may be an aqueous or organic electrolyte, including alkalis such as potassium and other hydroxides, lithium-ion containing organic solvents, polymer electrolytes, ionic liquid electrolytes in liquid or solid state and so forth. Suitable electrolytes for the chosen battery positive and negative electrode materials can be routinely selected by a person skilled in the art.

Busbars or Conductors

The busbar of the lead-acid battery may be of any suitable construction, and may be made from any suitable conductive material known in the art. The term "connected to" used in the context of the busbars refers to electrical connection, although direct physical contact is preferred. In the case where the battery is not of a typical lead-acid battery configuration with busbars, any conductor may be used that does not involve circuitry external to the battery.

Other Battery Features

Generally, the components of the battery will be contained within a battery case with further features appropriate to the type of battery employed. For example, in the case of lead-acid batteries, the lead-acid battery may be either of a flooded-electrolyte design or of a valve-regulated design. Where the lead-acid battery is a valve-regulated lead-acid battery, the battery may be of any suitable design, and may for instance contain gel electrolyte. Specific features of the battery unit appropriate to such designs are well known in the art of the invention.

The pressure that may be applied to the lead-acid battery may lie in the range of 5-20 kPa for flooded electrolyte design, and from 20-80 kPa for valve regulated lead-acid battery design.

Separators

Generally, each of the positive and negative electrodes is separated from adjacent electrodes by porous separators.

The separators maintain an appropriate separation distance between adjacent electrodes. Separators located between immediately adjacent lead-based negative electrodes and lead dioxide-based positive electrodes may be made from any suitable porous material commonly used in the art, such as porous polymer materials or absorptive glass microfibre ("AGM"). The separation distance (corresponding to separator thickness) is generally from 1-2.5 millimetres for these separators. Suitable polymer materials useful for forming the separators between the positive and negative electrodes forming the battery part are polyethylene and AGM. Polyethylene separators are suitably between 1 and 1.5 millimetres thick, whereas AGM separators are appropriately between 1.2 and 2.5 millimetres thick.

In the case of separators located between the positive electrode and the capacitor negative electrode, these are suitably much thinner than the separators of the battery part of the lead-acid battery. Advantageously, the separators are between 0.01 and 0.1 millimetres thick, and most preferably between 0.03 and 0.07 millimetres thick. These separators are suitably made from microporous polymer material such as microporous polypropylene. Other separators are AGM and the thickness of this type of separators is between 0.1 and 1 millimetres, and preferably between 0.1 and 0.5 millimetres.

Formation of Lead Acid Batteries

After assembling of the appropriate components together in a battery case, the lead-acid battery generally needs to be formed. The formation operation is well known in the field. It is to be understood that the references to "lead-based" and "lead dioxide-based" materials are used to refer to lead or lead dioxide itself, materials containing the metal/metal dioxide or to materials that are converted into lead or lead dioxide, as the case may be, at the given electrode.

As is indicated by the language used above, the lead-acid battery contains at least one of each type of electrode. The number of individual cells (made up of a negative and positive plate) in the battery depends on the desired voltage of each battery. For a 36-volt battery appropriate for use as a mild hybrid electric vehicle battery (which may be charged up to 42 volt), this would involve the use of 18 cells.

Electrode Arrangement

For best operation according to one embodiment, the positive and negative electrodes are interleaved, so that each positive electrode has one lead-based negative electrode to one side of it, and one capacitor negative electrode to the opposite side. Accordingly, the arrangement of one embodiment has alternating positive and negative electrodes, with the negative electrodes being alternately a lead-based electrode and a capacitor negative electrode. All of the negative electrodes (lead and carbon) are connected to the negative busbar, and the positive electrodes are connected to the positive busbar, so that each battery cell and ultracapacitor cell is connected in parallel in the common lead-acid battery.

Operation

As explained above, the ultracapacitor cell in the lead-acid battery arrangement described has a lower internal resistance than the lead-acid battery cell, and therefore it will first absorb a release charge during high-rate charging (for generative braking) or during high-rate discharge (vehicle acceleration and engine cranking). Consequently, the asymmetric capacitor cell will share the high-rate operation of the lead-acid battery cell and will provide the lead-acid battery with significantly longer life. More specifically, lead sulphate formation on the battery cell electrodes which generally occurs during high-current charging and discharging of the battery is minimised because the high-current charging and discharging is generally taken up by the asymmetric capacitor.

Each battery cell of one embodiment of the invention provides a voltage of 2-volts. A lead-acid battery of one embodiment suitable for use in the broad range of electric vehicle battery applications will contain 8 negative electrodes and 9 positive electrodes, with 4 of the negative electrodes being lead-based negative electrodes, and the other 4 being capacitor electrodes, in an alternating arrangement. Variations in this arrangement and relative numbers of electrodes are also suitable, provided that there is a minimum of one of each electrode.

EXAMPLES

Example 1

Figure 2:
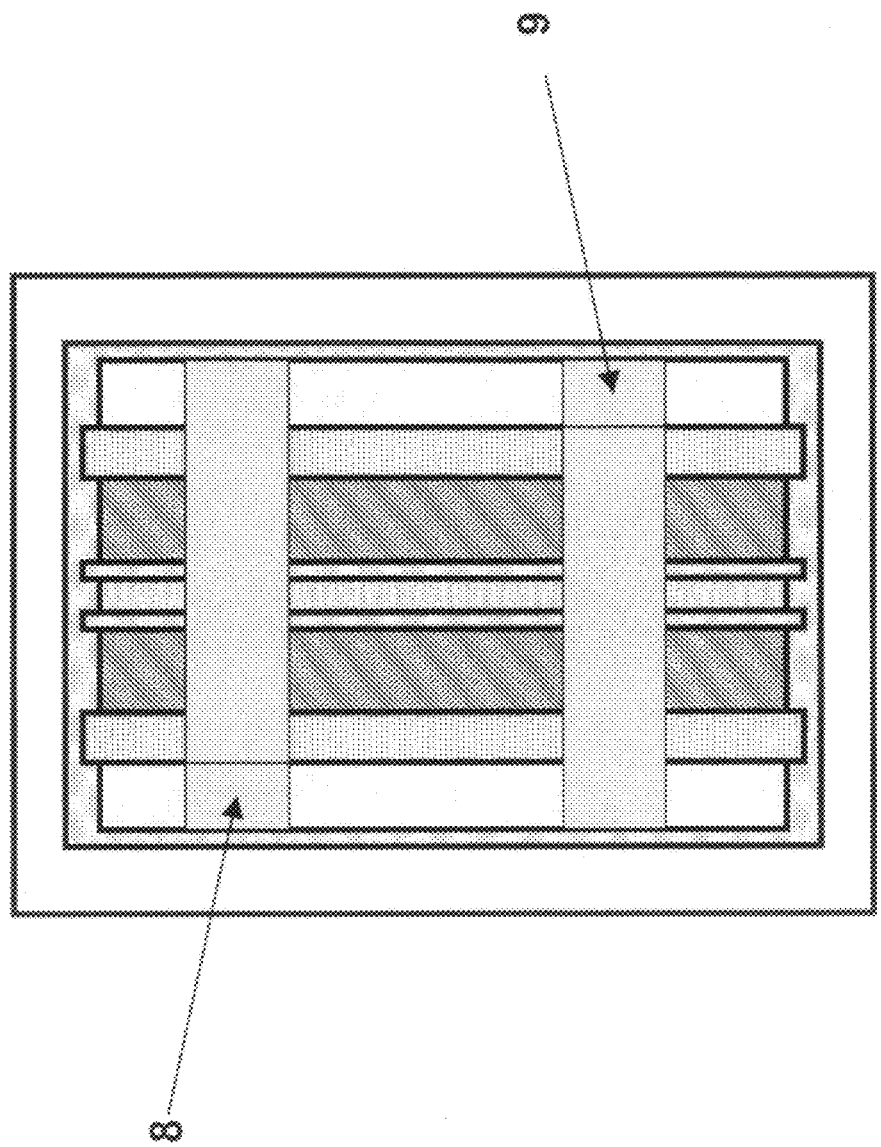
FIG. 2 is a schematic plan view of the lead-acid battery of FIG. 1.

A lead-acid battery of one embodiment of the invention suitable for testing purposes was made in the arrangement as illustrated schematically in FIGS. 1 and 2.

Two sponge lead (negative plate) electrodes (1), two lead dioxide positive plate electrodes (2) and one high surface-area negative carbon electrode plate (3) were positioned in an alternating arrangement as illustrated in FIG. 1 in a battery case (4). The positive lead dioxide electrodes (2) and negative lead electrodes (1) were 40 millimetres wide by 68 millimetres high by 3.3 millimetres thick. The carbon electrode (3) was 40 millimetres wide by 68 millimetres high by 1.4 millimetres thick. The battery electrodes were of a standard configuration and composition for lead-acid batteries, and were made by the methods described in the detailed description above. The lead electrode formation techniques used in this example are more fully described in our copending application PCT/AU2003/001404, the entire contents of which are incorporated by reference. In brief, the paste composition for the lead negative electrode comprised lead oxide (1 kg), fibre 0.6 g, $BaSO_4$ 4.93 g, Carbon black 0.26 g, $H_2SO_4$ (1.400 rel.dens.) 57 cm$^3$, water 110 cm$^3$, acid to oxide ratio 4% and paste density 4.7 g/cm$^3$. The paste composition for the lead dioxide positive electrode comprised lead oxide 1 kg, fibre 0.3 g, $H_2SO_4$ (1.400 rel.dens.) 57 cm$^3$, water 130 cm$^3$, acid to oxide ratio 4% and paste density 4.5 g/cm$^3$. The lead oxide was converted into lead dioxide and lead by the formation techniques described in our co-pending application.

The capacitor electrode (3) was made from 20 wt % carbon black with specific surface area of 60 m$^2$ g (Denki Kagaku, Japan), 7.5 wt % carboxymethyl cellulose, 7.5 wt % neoprene, and 65 wt % activated carbon with specific surface area of 2000 m$^2$ g$^{-1}$ (Kurarekemikaru Co. Ltd. Japan).

Separators (5, 6) were located between the adjacent electrodes. Absorptive glass microfibre (AGM) separators (5) of 2 millimetres in thickness were positioned between the lead-dioxide (2) and lead (1) electrodes, and microporous polypropylene separators (6) of 0.05 millimetres thickness were sandwiched between the positive electrodes (2) and carbon electrode (3).

The battery case (4) was filled with sulfuric acid solution (7). The positive electrodes were connected to a positive busbar (8), and the negative electrodes connected to a negative busbar (9). As noted below, for comparison purposes, for simulation of a battery containing no ultracapacitor cell component, the capacitor negative plate could be disconnected from the negative busbar.

For testing purposes, a charging and discharging profile was developed to simulate typical charge and discharge demands on a 42-volt mild HEV battery typically used in mild HEV applications. The profile has short duration (2.35 minutes) and is composed of several current steps that simulate the power requirements of the battery during vehicle operation. These are, in order:

(a) an idle stop section involving a discharge of 2 A over a 60 second period;
(b) a high current discharge of 17.5 A, lasting 0.5 seconds, simulating cranking;
(c) an 8.5 A power assistance discharge of 0.5 seconds;
(d) a 14-volt/2 A maximum, 70 second long engine charging section simulating charging of the battery during standard driving conditions;
(e) a 5 second rest period; and
(f) a 14-volt/2 A maximum period correlating to regenerative charging (regenerative braking) lasting 5 seconds.

The critical step is the cranking period over which the cell must deliver a current of 17.5 A for 0.5 seconds.

Testing

To test the life span of the battery of the example, two identical batteries were made, and one was thereafter modified to disconnect the capacitor carbon negative electrode from the negative busbar, to correspond to an equivalent battery without the integral ultracapacitor feature, hereafter referred to as the "comparison battery".

Figure 3:
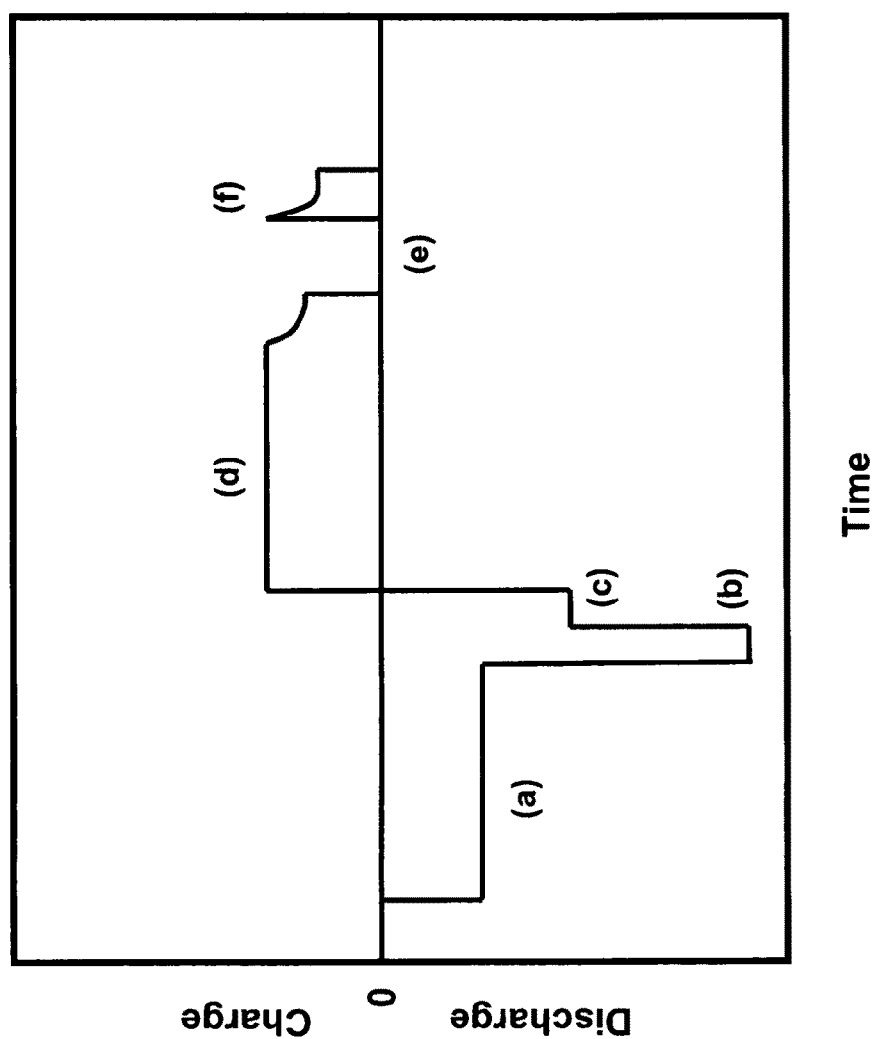
FIG. 3 is a graph representing a current profile of a single cycle of the test conducted on the battery of the embodiment of FIGS. 1 and 2.

Each battery was subjected to repeated cycles of the profile illustrated in FIG. 3 and described above. A cut-off voltage of 1.6-volts, which is a common cut-off voltage value for batteries in the field of the invention, was set, and the batteries were subjected to repetitive cycling through the charge cycle until the lowest voltage during discharge reached the cut-off value.

Figure 4:
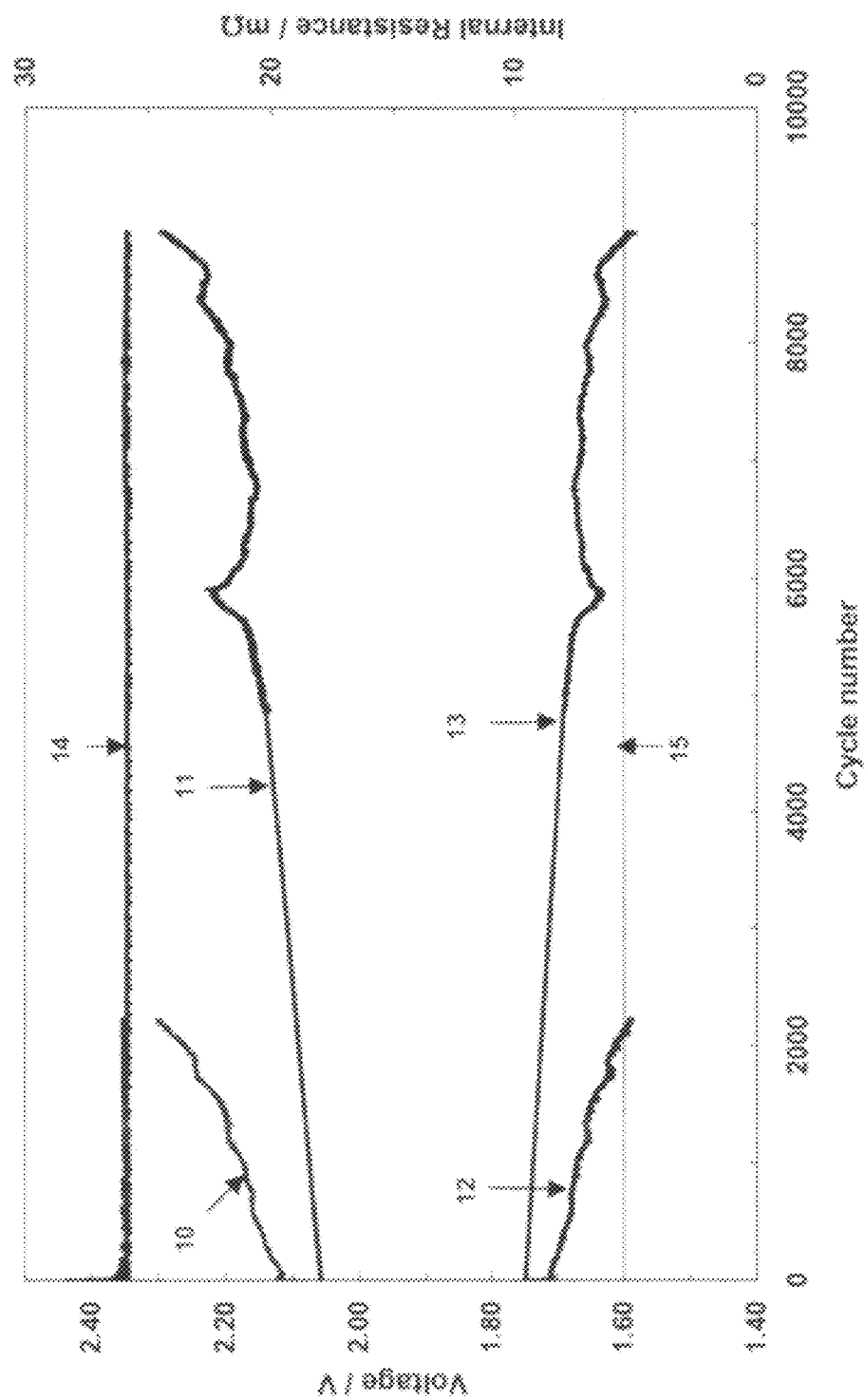
FIG. 4 is a graph representing the cycling performance of the battery of FIGS. 1 and 2 against a comparison battery.

The results of the test are illustrated in FIG. 4. In this figure, line 10 is the comparison battery internal resistance profile, line 11 is the Example 1 battery internal resistance profile, line 12 is the comparison battery minimum discharge voltage profile and line 13 is the Example 1 battery minimum discharge voltage profile.

During cycling, the following observations were made:
(i) the maximum charge voltages of the comparison battery and the battery of Example 1 are maintained at 2.35-volts, as represented by line 14.
(ii) the internal resistances of both batteries increase with cycling. Nevertheless, the internal resistance of the comparison battery increases faster than that of the battery of Example 1, for example, from 19 to 25 mΩ for the comparison battery and from 18 to 25 mΩ for the battery of Example 1.
(iii) The minimum discharge voltages of the comparison battery and the battery of Example 1 decrease with cycling, but the rate of decrease is faster for the comparison battery.

The comparison battery performs about 2150 cycles, while the battery of Example 1 performs 8940 cycles before the minimum discharge voltages of each battery reaches the cut-off value of 1.6-volts (represented by line 15. Thus, the cycling performance of the battery of Example 1 is at least four times better than that of the comparison battery.

Example 2

Figure 5:
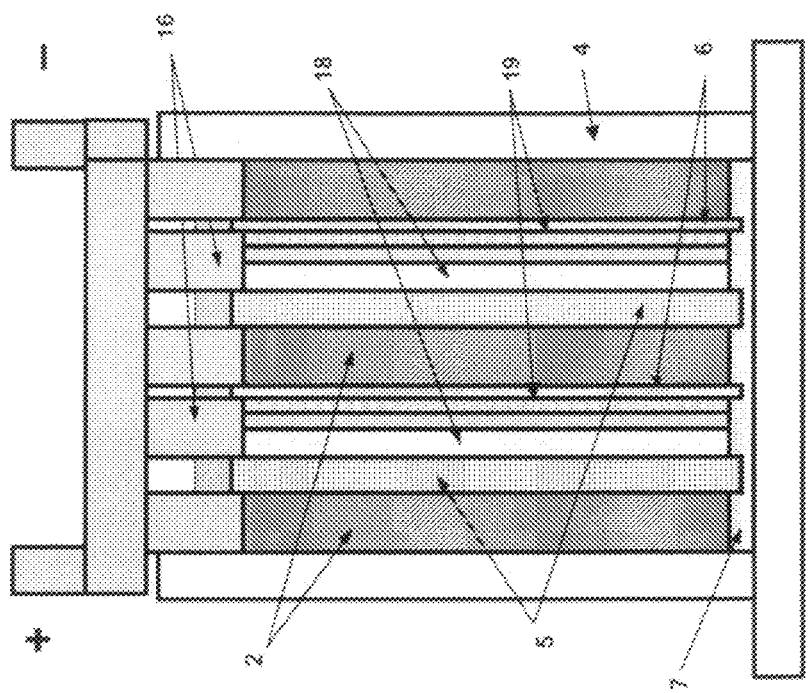
FIG. 5 is a schematic side view of a lead-acid battery in accordance with a second embodiment of the invention.
Figure 6:
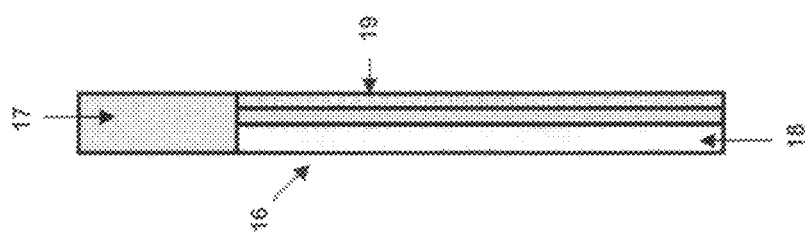
FIG. 6 is a schematic side view of one of the negative electrodes of the lead-acid battery of FIG. 5.

A variation on the battery of Example 1 is illustrated in FIGS. 5 and 6. For ease of comparison, the same numerals are used to refer to common features of the two batteries.

The embodiment of this Example comprises three lead dioxide positive plate electrodes (2) and two composite negative electrodes (16). The composite negative electrodes comprise a current collector or grid (17) with the lead-containing paste composition described above applied to one region (the face) thereof (18) and capacitor high surface-area carbon electrode material-containing paste applied to the opposite face (19). Formation of the electrode is conducted in the manner known in the art. In a variation on this embodiment that is simpler to manufacture, a lead based negative electrode is prepared with lead pasted by conventional dipping techniques to the main body section in lead paste material, followed by formation, and then the capacitor material is pasted to a region or regions of this lead based negative electrode, such as one face thereof. The positive (2) and negative composite electrodes (16) are positioned in an alternating arrangement as illustrated in FIG. 5 in a battery case (4).

The positive lead dioxide electrodes (2) and negative composite electrodes (16) of the embodiment illustrated in FIG. 5 are 40 millimetres wide by 68 millimetres high by 3.3 millimetres thick. The carbon electrode region (19) of the negative electrode takes up 1.4 millimetres of the thickness of the negative electrode.

Separators (5, 6) are located between the adjacent electrodes. Absorptive glass microfibre (AGM) separators (5) of 2 millimetres in thickness are positioned between the lead-dioxide (2) and lead face (18) of the negative electrode, and microporous polypropylene separators (6) of 0.05 millimetres thickness are sandwiched between the positive electrodes (2) and carbon face of the negative electrode (19).

The battery case (4) is filled with sulfuric acid solution (7). The positive electrodes are connected to a positive busbar (8), and the negative electrodes connected to a negative busbar (9).

Example 3

Further testing on the battery of Example 1 showed that improvements in electrolyte dry-out could be achieved by matching the hydrogen evolution rate of the carbon electrode (3) during battery charging to be similar to that of the lead negative electrode (1). This was achieved by replacing the carbon electrode of Example 1 with a modified carbon electrode (103) with 2.5 wt % PbO and 2.5 wt % ZnO, 65 wt % activated carbon, 20 wt % carbon black and binder (10 wt %) in the paste composition.

Figure 7:
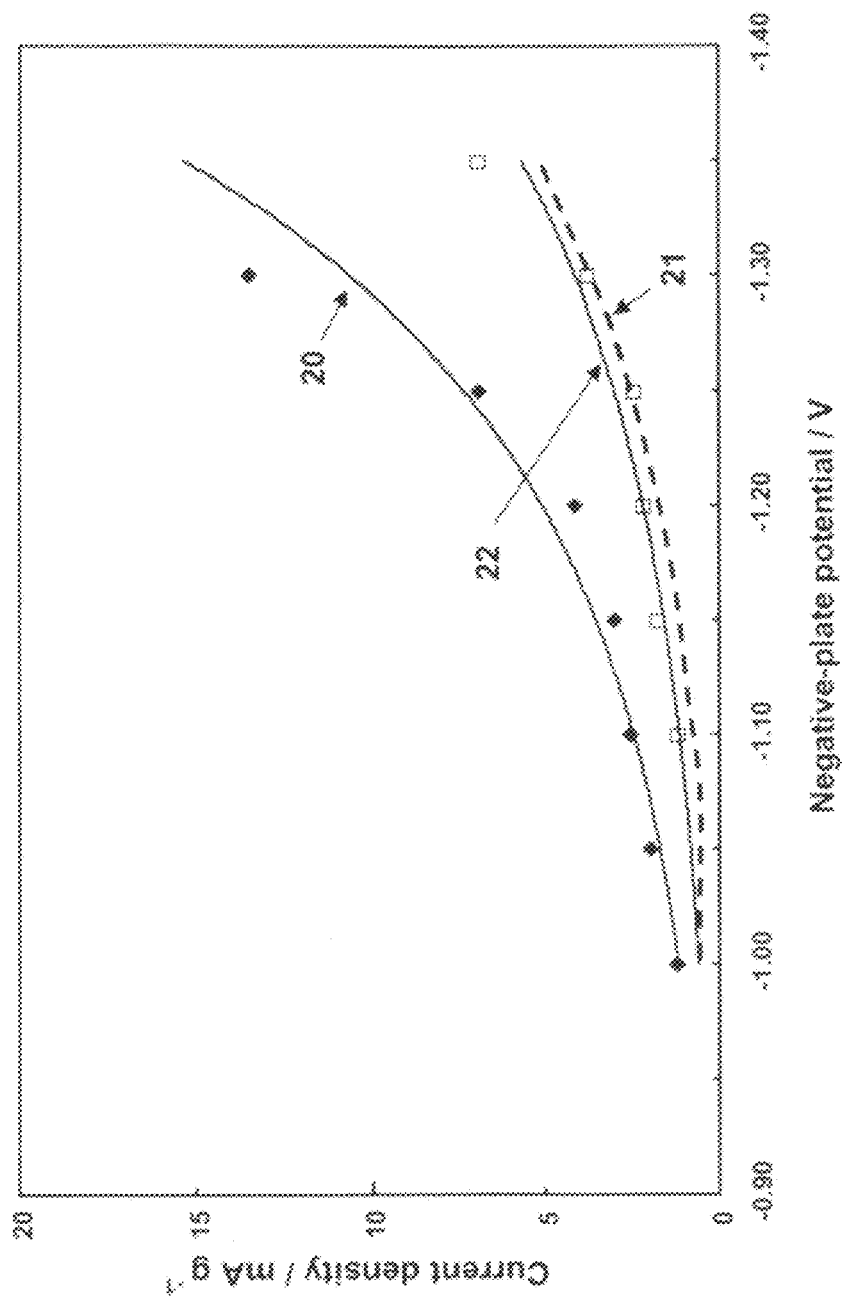
FIG. 7 is a graph representing the hydrogen evolution rate of a negative capacitor electrode of a fourth embodiment of the invention, compared to a standard carbon electrode and a standard lead-based negative electrode.

The hydrogen evolution rates for this electrode were tested and compared to the electrode used in Example 1, as well as the hydrogen evolution rates of the lead negative electrode of example 1. The results are shown in FIG. 7, in which curve 20 represents the carbon electrode hydrogen evolution rate, curve 21 represents the lead-acid negative plate hydrogen evolution rate, and the curve 22 represents the carbon plus additives electrode hydrogen evolution rate. The higher current density levels recorded for the carbon electrode with no oxide additive rise considerably at potentials falling below −1.2V, and even more so by −1.3V. By more closely matching the hydrogen evolution rate of the two electrodes, the battery can be operated at higher potentials without earlier failure due to electrolyte dry-out.

Inclusion of the oxide CdO would have a similar effect to ZnO and PbO, but for toxicity reasons was not used in the testing. Ago has a similar effect, but is an expensive additive and not as effective on its own. In other tests the levels of ZnO and PbO were varied within the range 1-10% and 1-20% respectively, and the AgO between 1-5%. The other oxides mentioned in the detailed description above have a similar impact to AgO.

Example 4

A further variation on the battery of Example 1 is illustrated in FIG. 8. For ease of comparison, the same numerals are used to refer to common features of the two batteries. In addition, for simplicity, only the battery electrodes are illustrated. It will be understood that the battery further includes the separators, case, electrolyte, busbars, terminals and other features of batteries common in the art.

The battery of this Example comprises an alternating series of positive and negative electrodes. The electrodes are, in order from left to right, a lead dioxide battery positive electrode (2), a lead-based battery negative electrode (3), a second lead dioxide battery positive electrode (2), a capacitor carbon and additive negative electrode of the type described in Example 3 (103), a capacitor-battery positive electrode as described further below (23), a second capacitor carbon and additive negative electrode of the type described in Example 3 (103), a second lead based battery negative electrode (3) and a third lead dioxide battery positive electrode (2). Each of the positive and negative electrodes, respectively, are connected to a positive conductor and a negative conductor, and to the positive and negative terminals of the battery.

The capacitor-battery electrode (23) comprises a metal current collector, with a mixture of activated carbon (60 wt %), carbon black (20 wt %) and 10 wt % of lead oxide pasted thereon. The paste composition is formed with 10 wt % [5 wt % carboxymethyl cellulose and 5 wt % neoprene] binder and sintered onto the current collector. The electrode is about 0.8 mm thick. In gassing tests it was shown that the inclusion of SbO and red lead in this capacitor positive electrode has an advantageous effect on gassing, and therefore these additives may further be contained in the capacitor positive electrode.

The battery of this Example can contain further alternating positive and negative electrodes of any type. Generally it is desirable to ensure that there is some level of matching the surface areas and hydrogen gassing rates of the sum of the positive and negative electrodes, and to include the requisite number of positive and negative electrodes to provide a battery of the desired voltage.

Thus, many modifications may be made to the embodiments and examples described above without departing from the spirit and scope of the invention.

The claims defining the invention are as follows:

1. A hybrid battery-capacitor comprising:
at least one battery-type positive electrode,
at least one battery-type negative electrode,
at least one capacitor-type electrode selected from a capacitor negative electrode and a capacitor positive electrode, wherein the capacitor negative electrode comprises a high surface area capacitor material and one or more additives selected from oxides, hydroxides or sulfates of lead, zinc, cadmium, silver and bismuth, and wherein the capacitor positive electrode comprises:
a high surface area capacitor material,
$Pb_2O_3$,
an oxide, hydroxide or sulfate of antimony, and
optionally one or more additives selected from oxides, hydroxides and sulfates of iron and lead, and
sulphuric acid electrolyte solution in contact with the electrodes,
wherein a battery part is formed between the battery-type positive electrode and the battery-type negative electrode, and an asymmetric capacitor part is formed between the capacitor electrode and one of the battery-type electrodes,
wherein one of the battery-type electrodes is shared by the battery part and the asymmetric capacitor part, and
wherein the negative electrodes are in direct electrical connection to a first conductor, and the positive electrodes are in direct electrical connection to a second conductor.

2. The hybrid battery-capacitor of claim 1, wherein the battery-type positive electrode comprises an electrode material selected from lead dioxide, nickel oxide, silver oxide, manganese oxide, lithium polymer materials, mixed lithium oxides including lithium nickel oxides, lithium cobalt oxides, lithium manganese oxides and lithium vanadium oxides, and lithium conductive polymer cathode materials.

3. The hybrid battery-capacitor of claim 1, wherein the battery-type negative electrode comprises an electrode material selected from lead, zinc, cadium, metal hydrides, lithium in metal or alloy form with other metals such as aluminium, and lithium ion intercalation materials.

4. The hybrid battery-capacitor of claim 1, wherein the electrodes alternate between positive and negative electrodes.

5. The hybrid battery-capacitor of claim 1, wherein the high surface area material is a high surface area carbon material.

6. The hybrid battery-capacitor of claim 1, wherein the capacitor-type electrode is a capacitor negative electrode, and the additive includes at least one oxide, hydroxide or sulfate of lead or zinc.

7. The hybrid battery-capacitor of claim 6, wherein the additive is present in a coating on the capacitor negative electrode in an amount that increases the voltage window of the capacitor negative electrode to at least −1.2 V.

8. The hybrid battery-capacitor of claim 6, wherein the total additive content is between 5-40 wt %, based on the total capacitor coating composition.

9. The hybrid battery-capacitor of claim 6, wherein the negative capacitor electrode additive comprises compounds of the following metals in oxide, sulfate or hydroxide from: between 1-40 wt % Pb; 1-20 wt % Zn; 0-5 wt % Cd and 0-5 wt % Ag.

10. The hybrid battery-capacitor of claim 1, wherein the capacitor-type electrode is a capacitor positive electrode, and the capacitor positive electrode additive is present in an amount of 5-40 wt %.

11. The lead-acid battery of claim 10, wherein the positive capacitor electrode additive comprises between 0-30 wt % Pb in oxide, sulfate or hydroxide form, 1-10 wt % Pb2O3, 0-2 wt % Fe in oxide, sulfate or hydroxide form and 0.05 to 1 wt % Sb in oxide, sulfate or hydroxide form.

12. The hybrid battery-capacitor of claim 1, wherein the hybrid battery-capacitor comprises both a capacitor positive electrode and a capacitor negative electrode.

13. The hybrid battery-capacitor of claim 1, wherein each of the positive and negative electrodes is separated from adjacent electrodes by porous separators.

14. A lead-acid battery comprising an alternating series of positive and negative electrodes and an electrolyte in contact with the electrodes, wherein:
   at least one pair of positive and negative electrodes or electrode regions store energy capacitively, and one of said electrodes or regions comprises capacitor electrode material;
   at least one pair of lead dioxide positive and lead negative battery electrodes or electrode regions store energy electrochemically,
   the electrolyte is a sulfuric acid electrolyte solution,
   and wherein the positive electrodes are directly connected by a first conductor and the negative electrodes are directly connected by a second conductor.

* * * * *